(12) United States Patent
Kim et al.

(10) Patent No.: US 8,337,961 B2
(45) Date of Patent: Dec. 25, 2012

(54) ACRYLIC PRESSURE-SENSITIVE ADHESIVE COMPOSITION FOR POLARIZING PLATE, CONTAINING A PHOTO-INITIATOR GROUP

(75) Inventors: No Ma Kim, Daejeon (KR); Jeong Min Ha, Daejeon (KR); Min Ki Lee, Daejeon (KR); Suk Ky Chang, Seoul (KR)

(73) Assignee: LG Chem, Ltd., Seoul (KR)

( * ) Notice: Subject to any disclaimer, the term of this patent is extended or adjusted under 35 U.S.C. 154(b) by 121 days.

(21) Appl. No.: 12/312,212

(22) PCT Filed: Oct. 31, 2007

(86) PCT No.: PCT/KR2007/005428
§ 371 (c)(1),
(2), (4) Date: Feb. 5, 2010

(87) PCT Pub. No.: WO2008/054137
PCT Pub. Date: May 8, 2008

(65) Prior Publication Data
US 2010/0129568 A1    May 27, 2010

(30) Foreign Application Priority Data
Nov. 1, 2006  (KR) .................. 10-2006-0107452

(51) Int. Cl.
*C09K 19/00*   (2006.01)
(52) U.S. Cl. ........ 428/1.1; 428/1.54; 522/182; 522/167; 522/168; 526/319; 526/329.2
(58) Field of Classification Search .............. 428/523, 428/1.1, 1.54, 354; 526/319, 326, 329.2; 522/167, 168, 172, 182; 525/100
See application file for complete search history.

(56) References Cited

U.S. PATENT DOCUMENTS

| | | | |
|---|---|---|---|
| 5,240,989 A * | 8/1993 | Bernard et al. | 524/560 |
| 6,663,978 B1 * | 12/2003 | Olson et al. | 428/523 |
| 6,831,114 B2 | 12/2004 | Husemann et al. | |
| 2002/0006979 A1 * | 1/2002 | Husemann et al. | 522/34 |
| 2003/0103186 A1 * | 6/2003 | Sasaki et al. | 349/194 |
| 2004/0049972 A1 | 3/2004 | Husemann et al. | |
| 2004/0249102 A1 | 12/2004 | Husemann et al. | |
| 2007/0055006 A1 * | 3/2007 | Kim et al. | 524/556 |
| 2007/0117918 A1 * | 5/2007 | Kim et al. | 524/556 |

FOREIGN PATENT DOCUMENTS

| | | |
|---|---|---|
| JP | 09033723 A1 | 2/1997 |
| KR | 2006-0049137 | 5/2006 |
| WO | WO 2006-059780 A1 | 6/2006 |

\* cited by examiner

*Primary Examiner* — Angela Ortiz
*Assistant Examiner* — Ruiyun Zhang
(74) *Attorney, Agent, or Firm* — McKenna Long & Aldridge, LLP

(57) ABSTRACT

The present invention relates to an acrylic pressure-sensitive adhesive composition which comprises a (meth)acrylic copolymer comprising an alkyl(meth)acrylic acid ester monomer, in which alkyl has 2 to 14 carbon atoms, and a (meth)acrylic acid ester monomer containing a copolymerizable photo-initiator group, wherein it has a gel fraction of 10 to 55% and a swelling ratio of 30 to 110, and a sol (uncrosslinked polymer) eluted in final pressure-sensitive adhesive with a solvent (ethyl acetate) has a weight average molecular weight of 600,000 or more; and a polarizing plate and a liquid crystal display device, comprising the same. The polarizing plate according to the present invention has an excellent adhesion durability under a high temperature or a high temperature and humidity condition, has an excellent low light leakage property by effectively providing stress release property, and may greatly improve productivity for polarizing plates, by using photo-curing.

15 Claims, No Drawings

ACRYLIC PRESSURE-SENSITIVE ADHESIVE COMPOSITION FOR POLARIZING PLATE, CONTAINING A PHOTO-INITIATOR GROUP

This application is a national stage entry of International Application No. PCT/KR2007/005428, filed Oct. 31, 2007, and claims the benefit of, Korean Application No. 10-2006-0107452, which hereby incorporated by reference for all purposes as if fully set forth herein.

TECHNICAL FIELD

The present invention relates to an acrylic pressure-sensitive adhesive composition for a polarizing plate. More specifically, the present invention relates to a pressure-sensitive adhesive composition for a polarizing plate having an excellent durability and low light leakage property under a high temperature or a high temperature and humidity condition, and being capable of greatly improving workability for polarizing plates and productivity, a polarizing plate produced from the same, and a liquid crystal display device applying the same thereon.

BACKGROUND ART

Generally, in preparing liquid crystal display devices, liquid crystal cells comprising liquid crystals and polarizing plates are basically required and suitable adhesive layers or pressure-sensitive adhesive layers have to be used for binding them. In addition, for improving functions of liquid crystal display devices, a phase retardation plate, a compensation plate for wide view angle, a brightness enhancement film, and the like may be used, with additionally adhered to the polarizing plate.

Major structure forming a liquid crystal display device comprises, generally, a uniformly aligned liquid crystal layer; a polarizing plate with a multi-layer structure, incorporated into a pressure-sensitive adhesive layer or an adhesive layer, based on a liquid crystal cell consisted of a transparent glass plate or plastic sheet material containing a transparent electrode layer; a phase retardation plate; and an additional functional film layer and the like.

The structure of polarizing plate is one comprising an iodine compound or a dichroic polarizing material aligned in a certain direction. To protect these polarizing elements, multi-layers are formed on both sides using a protective film such as triacetyl cellulose (TAC). In addition, the polarizing plate may additionally comprise a phase retardation film, or a compensation film for wide view angle such as a liquid crystal type film, in a shape having a unidirectional molecular alignment.

The aforementioned films are made of materials having different molecular structures and compositions, and so have different physical properties. Especially, under a high temperature or a high temperature and humidity condition, the dimensional stability according to shrinkage or expansion of materials having a unidirectional molecular alignment is insufficient. As a result, if the polarizing plate is fixed by a pressure-sensitive adhesive, deforming stress by shrinkage or expansion of polarizing plates under a high temperature or a high temperature and humidity condition is in remained state, and thereby light leakage occurs in the part on which stress is focused.

In a method for improving the above light leakage phenomenon, it is needed to reduce the shrinkage of the polarizing plates in a high temperature or a high temperature and humidity condition. However, it is very difficult to remove the stress generated from a liquid crystal panel to which a polarizing plate consisted of materials having different physical properties is attached. Another method for improving the light leakage phenomenon is one designed to provide a stress release function to a pressure-sensitive adhesive layer that fixes a polarizing plate to a liquid crystal panel. Generally, a pressure-sensitive adhesive includes rubbers, acrylics, and silicones and the like. Among these, acrylic pressure-sensitive adhesives are advantageous in terms of adhesion property, optical property, durability, and weatherability, and so have been most widely used for manufacturing pressure-sensitive adhesive composition for polarizing plates.

In order to add said stress release function to the pressure-sensitive adhesive layer, usual pressure-sensitive adhesives are designed so that they may have a large magnitude of creep against an external stress and be easily deformed. As a representative method has been attempted that an acrylic high molecular weight polymer comprising a reactive cross-linking functional group reactive with a multi-functional cross-linking agent is reacted to set an appropriate cross-linking density, satisfy durability under a high temperature or a high temperature and humidity condition and improve the stress release of pressure-sensitive adhesives. It is known to use isocyanates and epoxys multi-functional cross-linking agents as a preferred method for forming a cross-linking density of acrylic pressure-sensitive adhesive. Such a method for preparing pressure-sensitive adhesives may control physical properties of final pressure-sensitive adhesives by mixing a cross-linking agent and an acrylic polymer containing a functional group reactive therewith, coating the mixture on a substrate, heating and drying, followed by a reaction of the acrylic polymer with the cross-linking agent. However, when pressure-sensitive adhesives are prepared by such a method, it takes very long aging time. In addition, since cross-linking does not occur yet immediate after drying, the pressure-sensitive adhesive has very low modulus and thereby may greatly cause problems for workability such as a trouble that must be stored in low-temperature storage, or To solve the above problems by increasing the cross-linking speed of pressure-sensitive adhesive, it is a preferable method for cross-linking it by light, instead of a chemical cross-linking reaction. For example, JP Unexamined Patent Publication No. S49-005145 discloses an attempt that an acrylic polymer having a double-bond in a side chain is prepared and cross-linked with radiation. In addition, JP Unexamined Patent Publication No. 2001-107005 discloses a method comprising mixing 100 parts by weight of a high molecular weight acrylic copolymer having a weight average molecular weight of 500,000 to 2,000,000 and 1 to 100 parts by weight of an acrylic polymer having a weight average molecular weight of 200,000 to 1,000,000 and a double bond in a side chain, and then injecting a photo-initiator to the mixture, followed by radiation cross-linking. In addition, since a high molecular weight acrylic polymer is used, in which a number of double bonds are introduced in the side chain, it is difficult to regulate an appropriate cross-linking structure. Since double bonds in the side chain remain, it is more likely to affect optical properties.

On the one hand, in U.S. Pat. No. 4,144,157, an aspect attempting the radiation cross-linking is disclosed, using an acrylic copolymer in which a photo-initiator is introduced in the side chain by a photo-initiator copolymerizable with a acrylic monomer. In JP Unexamined Patent Publication No. 1995-032797, there is an aspect that a pressure-sensitive adhesive for skin is prepared via preparing an acrylic polymer using an aromatic ketone photo-initiator monomer copolymerizable with an acrylic monomer, followed by radiation cross-linking thereof. In U.S. Pat. No. 6,586,491, an aspect using in a pressure-sensitive adhesive for hot melt is published, wherein an acrylic polymer having a molecular weight of more than 500,000 or more and an acrylic copolymer having a molecular weight of 500,000 or less and introducing a photo-initiator in the side chain are mixed. However, the above arts do not disclose technical ideas about regulating cross-linking structures, thereby regulating stress release properties and durability of pressure-sensitive adhesives.

DISCLOSURE OF THE INVENTION

To solve the conventional problems above, one object of the present invention is to provide an acrylic pressure-sensitive adhesive composition controlling loss of workability for polarizing plates, without changing the major characteristics such as adhesive durability which may be occurred under a high temperature or a high temperature and humidity condition and greatly reducing modulus thereof, and having the improved light leakage phenomenon via improving stress release property and the greatly improved productivity for polarizing plates via photo-curing on preparing pressure-sensitive adhesives.

Another object of the present invention is to provide a polarizing plate using the acrylic pressure-sensitive adhesive composition with said characteristics.

The other object of the present invention is to provide a liquid crystal display device comprising a polarizing plate prepared by the acrylic pressure-sensitive adhesive composition with said characteristics.

These objects of the present invention may be achieved by the present invention detailed below.

The present invention relates to an acrylic pressure-sensitive adhesive composition for polarizing plates which comprises a (meth)acrylic copolymer comprising an alkyl(meth)acrylic acid ester monomer, in which alkyl has 2 to 14 carbon atoms, and a monomer containing a copolymerizable photo-initiator group, wherein it has a gel fraction, represented by Equation 1, of 10 to 55% and a swelling ratio, represented by Equation 2, of 30 to 110, and a sol (uncross-linked polymer) eluted the final cross-linked pressure-sensitive adhesive with a solvent (ethyl acetate) has a weight average molecular weight of 600,000 or more.

$$\text{Gel fraction}(\%) = B/A \times 100 \quad (1)$$

$$\text{Swelling ratio} = C/B \quad (2)$$

wherein, A represents weight of acrylic pressure-sensitive adhesive composition, B represents dry weight of insoluble content after depositing acrylic pressure-sensitive adhesive composition in ethyl acetate at ambient temperature for 48 hours, and C represents weight of insoluble content swollen with ethyl acetate after depositing acrylic pressure-sensitive adhesive composition in ethyl acetate at ambient temperature for 48 hours (weight of insoluble content of acrylic pressure-sensitive adhesive composition+weight of permeated solvent).

Preferably, a weight distribution of (meth)acrylic copolymers (a ratio of weight average molecular weight and number average molecular weight) is 2.0 to 7.0.

BEST MODE FOR CARRYING OUT THE INVENTION

Each component of (meth)acrylic copolymers according to the present invention is embodied below.
<(Meth)acrylic Ester Monomer>
The alkyl(meth)acrylic acid ester monomer in which alkyl has 2 to 14 carbon atoms, according to the present invention, is preferably one or more selected from the group consisting of ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, n-octyl (meth)acrylate, isooctyl (meth)acrylate, isononyl (meth)acrylate, lauryl (meth)acrylate, and tetradecyl (meth)acrylate. If the carbon number of alkyl is departed from the above range, the glass transition temperature (Tg) of the pressure-sensitive adhesive is increased, or regulation of the adhesive property is difficult. Therefore, the carbon number is limited within a range of 2-14. Said alkyl(meth)acrylic acid ester may be used alone or in combination with of two or more species. For regulation of adhesion and cohesion, said alkyl(meth)acrylic acid ester monomer, in which alkyl has 2 to 14 carbon atoms, in all monomer components is preferably used in a range of 50 to 99.8 parts by weight, and more preferably 80 to 99.8 parts by weight.
<Copolymerizable Photo-Initiator>
To give cross-linkable functional groups to the acrylic copolymer containing the alkyl(meth)acrylic acid ester monomers, in which alkyl has 2 to 14 carbon atoms, as a main component, photo-initiators cross-linkable with acrylic acid ester monomers are used.

As long as the usable photo-initiators in the compositions according to the present invention may be cross-linked with said acrylic copolymers and are monomers having photo-initiating functional groups, they may be used without any limitation. For example, monomers represented by Formula 1 below may be used.

$$X\text{—}Y \quad 1$$

wherein,

X represents a hydrocarbon group containing an ethylenic double bond, and

Y represents a hydrocarbon group that may contain a photo-initiating functional group and a heteroatom.

In the above formula,

X preferably represents P-Q, wherein P-Q represents $CR_1R_2\text{=}CR\text{—}CO\text{—}$, where $R_1$, $R_2$, and R each represents hydrogen or methyl, and Q represents O or a single bond, and Y preferably represents a hydrocarbon group containing a benzoyl group such as benzophenone, thioxanthone, benzyl ketal, alpha-hydroxyalkyl phenone, or alpha-aminoalkyl phenone, titanocene, camphorquinone, trichloromethyl-triazine or thioxanthene.

More specific examples of said copolymerizable photo-initiators include acrylic acid [(2-methoxy-2-phenyl-2-benzoyl)-ethyl]ester, phenyl 2-acryloyloxy-2-propyl ketone, phenyl 2-methacryloyloxy-2-propyl ketone, 4-isopropenylphenyl 2-acryloyloxy-2-propyl ketone, 4-chlorophenyl 2-acryloyloxy-2-propyl ketone, 4-dodecylphenyl 2-acryloyloxy-2-propyl ketone, 4-methoxyphenyl 2-acryloyloxy-2-propyl ketone, 4-acryloyloxyphenyl 2-hydroxy-2-propyl ketone, 4-methacryloyloxyphenyl 2-hydroxy-2-propyl ketone, 4-(2-acryloyloxyethoxy)-phenyl 2-hydroxy-2-propyl ketone, 4-(2-acryloyloxydiethoxy)-phenyl 2-hydroxy-2-propyl ketone, 4-(2-acryloyloxyethoxy)-benzoin, 4-(2-acryloyloxyethylthio)-phenyl 2-hydroxy-2-propyl ketone, 4-N,N'-bis-(2-acryloyloxyethyl)-aminophenyl 2-hydroxy-2-propyl ketone, 4-acryloyloxyphenyl 2-acryloyloxy-2-propyl ketone, 4-methacryloyloxyphenyl 2-methacryloyloxy-2-propyl ketone, 4-(2-acryloyloxyethoxy)-phenyl 2-acryloyloxy-2-propyl ketone, or 4-(2-acryloyloxydiethoxy)-phenyl 2-acryloyloxy-2-propyl ketone and the like. A commercial product is acrylate benzophenone (Trade name: Ebecryl P36, manufactured by UCB).

The amount of said copolymerizable photo-initiator monomer may be appropriately selected according to the desired cross-linking structure, but not specifically limited. Generally, the amount of said copolymerizable photo-initiator monomer is 0.01 to 3 parts by weight, and preferably 0.1 to 1 part by weight, in all monomers. If the amount of copolymerizable photo-initiator is less than 0.01 parts by weight, the cross-linked structure is so loosened to have poor durability. If the amount is in excess of 3 parts by weight, the cross-linked structure is so dense formed to have insufficient stress release property of the pressure-sensitive adhesive and thus an outstanding light leakage phenomenon.

<Polar Monomer>

To modulate the adhesion and cohesion strength of said (meth)acrylic copolymers, they, preferably, further comprise 0.01 to 5 parts by weight of vinyl monomer containing a hydroxyl group or a carboxyl group as a polar monomer. Their examples may include 2-hydroxyethyl (meth)acrylate, 2-hydroxypropyl (meth)acrylate, 4-hydroxybutyl (meth)acrylate, 2-hydroxyethyleneglycol (meth)acrylate, 2-hydroxypropyleneglycol (meth)acrylate, acrylic acid, methacrylic acid, acrylic acid dimer, itaconic acid, maleic acid, or maleic anhydride, and the like, and may select one or more from these monomers. If the amount of said monomer is too high, the adhesiveness is lowered and the releasability strength is lowered. Therefore, it is preferred to use 0.01 to 5 parts by weight of total monomer components.

<Vinyl Monomer>

To regulate the glass transition temperature of the pressure-sensitive adhesive or provide other functionalities, the (meth)acrylic copolymers according to the present invention further comprise 0 to 20 parts by weight, preferably, 0.01 to 20 parts by weight of a vinyl monomer of Formula 2 relative to weight of total monomers as an optional component.

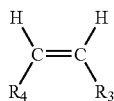

2 wherein, $R_4$ represents hydrogen or alkyl, $R_3$ represents cyano, phenyl unsubstituted or substituted with alkyl, acetyloxy, or $COR_5$, where $R_5$ represents amino or glycidyloxy unsubstituted or substituted with alkyl.

In the formula above, alkyl in definitions of $R_3$ to $R_5$ preferably, represents lower alkyl of 1 to 6 carbon atoms, and more preferably, methyl or ethyl.

Examples of said compound of Formula 2 may include styrene monomers such as styrene or alpha methyl styrene; carboxylic acid vinyl esters such as vinyl acetate; or vinyl monomers containing nitrogen such as (meth)acryl amide, or N-butoxy methyl(meth)acryl amide. If the amount of said vinyl group containing monomer in the acrylic copolymer is too large, the flexibility and the peel strength of the pressure-sensitive adhesive are decreased. Therefore, it is preferred to use less than 20 parts by weight of the total monomer components.

<Gel Content and Swelling Ratio>

The acrylic pressure-sensitive adhesive of the present invention has a gel fraction, represented by Equation 1, of 10 to 55%, and a swelling ratio, represented by Equation 2, of 30 to 110, and a sol eluted in the crosslinked pressure sensitive adhesive with a solvent (ethyl acetate) has a weight average molecular weight of 600,000 or more.

$$\text{Gel fraction}(\%) = B/A \times 100 \quad (1)$$

$$\text{Swelling ratio} = C/B \quad (2)$$

wherein, A, B and C are as defined above.

The gel content of acrylic pressure-sensitive composition according to the present invention is 10 to 55%, preferably 15 to 40%, more preferably 15 to 35%.

If the said gel fraction is more than 55%, the stress release property of the pressure-sensitive adhesive is significantly decreased. If the said gel fraction is less than 10%, the durability under a high temperature or a high temperature and humidity is much deteriorated.

At the same time, if the swelling ratio measured by gel is less than 30, the cross-linked structure becomes so dense to have insufficient stress release property of the pressure-sensitive adhesive. If the swelling ratio is in excess of 110, the cross-linked structure is so loosened to have poor durability.

Also, if the molecular weight of the sol eluted by a solvent is less than 600,000, each cross-linked structure is not sufficiently linked to the sol part so that the durability is deteriorated.

On the other hand, if the molecular weight distribution of sol is less than 2, the stress release property is insufficient. If it is more than 7, there is a problem in the durability. Therefore, the molecular weight distribution of sol is preferably regulated in a range of 2.0~7.0, and most preferably in a range of 3~5.5.

<Additives>

In addition, the present composition may further comprise a silane coupling agent. If it is adhered to a glass substrate, this may improve adhesion stability and thus mat improve thermal/moisture resistance. When the glass substrate is left for a long time under a high temperature and humidity, the above silane coupling agent serves to be of help to improve adhesion reliability, which may be used in an amount of 0.005 to 5 parts by weight based on 100 parts by weight of the acrylic copolymer. Said silane coupling compound is γ-glycycloxypropyl trimethoxysilane, γ-glycycloxypropyl methyldiethoxysilane, γ-glycycloxypropyl tri-ethoxysilane, 3-mercaptopropyl trimethoxysilane, vinyl trimethoxysilane, vinyl tri-ethoxysilane, γ-methacryloxypropyl trimethoxysilane, γ-methacryloxypropyl triethoxysilane, γ-aminopropyl trimethoxysilane, γ-aminopropyl triethoxysilane, 3-isocyanatepropyl triethoxysilane, or γ-acetoacetatepropyl trimethoxysilane and the like. These may be used alone or in a mixture thereof.

In addition, to regulate the adhesion property, the present invention may further comprise a tackifier resin, which may be used in an amount of 1 to 100 parts by weight based on 100 parts by weight of the acrylic copolymer. If said tackifier resin is used in an excess amount, the compatibility or the cohesion strength of pressure-sensitive adhesive may be decreased. Therefore, the tackifier resin should be carefully and appropriately added thereto. Examples of the tackifier resin may be (hydrogenated) hydrocarbon resins, a (hydrogenated) rosin resin, a (hydrogenated) rosin ester resin, a (hydrogenated) terpene resin, a (hydrogenated) terpene phenol resin, a polymerized rosin resin, or a polymerized rosin ester resin, and the like. These may be used alone or by mixing two or more of the above resins.

In addition, for special purposes, a plasticizer, an epoxy resin, a hardener, etc. may be additionally mixed and used in the present invention, and for general purposes, a UV stabilizer, an antioxidant, a colorant, a reinforcing agent, a filler, a defoaming agent, a surfactant, etc. may be properly added and used.

<Polymerization Method>

The method for preparing the said acrylic copolymer is not specifically limited, and the acrylic copolymer can be prepared by solution polymerization, photo-polymerization, bulk polymerization, suspension polymerization, or emulsion polymerization. Preferably, it is prepared by using solution polymerization. The polymerization temperature is preferably 50 to 140°, and the initiator is preferably added in a state that monomers are evenly mixed.

Such polymerization initiator may use an azo-based polymerization initiator such as azobisisobutyronitrile and azobiscyclohexanecarbonitrile, or peroxide such as benzoyl peroxide or acetyl peroxide alone or in a mixture thereof.

The present invention is to provide a polarizing plate comprising the said acrylic pressure-sensitive adhesive composition as an adhesive layer.

The polarizing plate of present invention comprises a pressure-sensitive adhesive layer containing the said acrylic pressure-sensitive adhesive composition and formed on one side or both sides of the polarizing film. A polarizing film or a polarizing device constituting the polarizing plate is not specifically limited.

Preferably, the said polarizing film is, for example, a film obtained by containing a polarizing component such as iodine or dichroic dye onto polyvinyl alcohol resin film, and elongating the resulted product. The thickness of the polarizing film is also not specifically limited, and may form in usual thickness. The said polyvinyl alcohol resin may use polyvinyl alcohol, polyvinyl formal, polyvinyl acetal and ethylene, saponified vinyl acetate copolymer, and the like.

On both sides of the polarizing film, multilayer films may be formed, on which a protective film is laminated, such as a cellulose film, for example, triacetyl cellulose, etc.; a polycarbonate film; a polyester film, for example, a polyethylene terephthalate, etc.; a polyether sulphone film; a polyolefin film, for example, polyethylene, polypropylene, polyolefine having cyclo or norbornene structure, or ethylene propylene copolymer. The thickness of these protective films is not specifically limited, and may form usual thickness.

The method of forming the pressure-sensitive adhesive layer on a polarizing film is not specifically limited in the present invention, which may be applied by a method of coating the pressure-sensitive adhesive directly on the surface of a polarizing film, using Bar Coater and the like, and drying the adhesive, or a method of coating the pressure-sensitive adhesive on the surface of releasable substrate, drying the adhesive, transferring the pressure-sensitive adhesive layer formed on the surface of releasable substrate to the surface of polarizing film, and aging the layer.

In addition, on the polarizing plate of the present invention may be laminated one or more layers providing additional functions, such as protective layer, reflecting layer, anti-glare layer, phase retardation plate, compensation film for wide view angle, and brightness enhancing film.

The polarizing plate applied by the pressure-sensitive adhesive of the present invention can be applied to all usual liquid crystal display devices, the kind of which liquid crystal panel is not specifically limited. Preferably, the present invention may construct a liquid crystal display device comprising a liquid crystal cell and the pressure-sensitive adhesive polarizing plate bound to one side or both sides of the liquid crystal cell.

The present invention is explained in more detail through examples and comparative examples below. The examples are provided to help the specific understanding of the present invention, but the scope of the present invention is not restricted to these examples.

Preparation Example 1

To 1 L reactor equipped with a cooling system for reflux of nitrogen gas and easy regulation of temperature was added a mixture of monomers consisting of 98.5 parts by weight of n-butylacrylate (BA), 1.0 part by weight of hydroxymethacrylate, and 0.5 parts by weight of acrylate benzophenone (Trade name: Ebecryl P36, manufactured by UCB), as the composition represented in Table 1 below. Then, 120 parts by weight of ethyl acetate (EAc) was added thereto as a solvent. To remove oxygen, nitrogen gas was purged for 60 minutes, and the temperature was kept at 60°. 0.03 parts by weight of azobisisobutyronitrile (AIBN), a reaction initiator, was added thereto and reacted for 8 hours. After the reaction, the resulting product was diluted with ethyl acetate (EAc) to prepare an acrylic copolymer having a solid content of 20% by weight, a weight average molecular weight of 1,500,000, and a molecular weight distribution of 4.9.

Preparation Examples 2 to 7

As shown in Table 1 below, high molecular weight acrylic copolymers were prepared by not adding or partially adding some of each component in Preparation Example 1. The results thereof were represented in Table 1.

Example 1

Combination 20 parts by weight of the obtained high molecular weight acrylic copolymer in Preparation Example 1 and 80 parts by weight of the obtained high molecular weight acrylic copolymer in Preparation Example 6 were homogenously mixed and 0.1 parts by weight of γ-glycidoxypropyltrimethoxysilane were added. The mixture was diluted in a suitable concentration and homogeneously mixed, considering the coating property. The resulting product was coated on a releasing sheet and dried to obtain a 30 micron homogenous pressure-sensitive adhesive layer. The pressure-sensitive adhesive layer dried on the releasing film was placed in a high-pressure mercury UV radiator and irradiated at 450 $mJ/cm^5$ for 5 seconds to crosslink the layer.

<Laminating Process>

The prepared pressure-sensitive adhesive layer above was subjected to adhesion to a iodine polarizing plate with a thickness of 185 microns. The resulting polarizing plate was cut into proper sizes and evaluated. The results evaluated for the polarizing plate on which the pressure-sensitive adhesive was applied were represented in Table 2 below.

Examples 2-4

Acrylic copolymers were subjected to combination and lamination by the same method as Example 1 except that some were not combined or partially combined, based on combinations in Example 1, as combination ratios in Table 2 below. Hereinafter, the durability and the uniformity of light transmission were evaluated by the same method as Example 1, and the results were represented in Table 2 below.

Comparative Examples 3-7

Acrylic copolymers were subjected to combination and lamination by the same method as Example 1 except that some were not combined or partially combined, based on combinations in Example 1, as combination ratios in Table 2 below. Hereinafter, the durability and the uniformity of light transmission were evaluated by the same method as Example 1, and the results were represented in Table 2 below.

Experimental Example

Measurement of Gel Fraction

The pressure-sensitive adhesive dried in the above combination process was left in a constant temperature and humidity chamber (23° C. and 60% RH) for 10 days. About 0.3 g of the pressure sensitive adhesive was poured into a #200 stainless steel mesh and dipped into 100 ml of ethyl acetate. Then, the resulting product was stored in a dark room at room temperature for 2 days. The insoluble contents were separated and dried in an oven at 70° C. for 4 hours. Then, their weight was measured.

Measurement of Swelling Ratio

On measuring the gel content, insoluble contents were separated, and weights of insoluble contents and solvent contained (swelled) therein were measured. The measured weights were divided by weight of insoluble content after drying to afford the swelling ratio.

Adhesion Strength

The polarizing plate coated with the pressure-sensitive adhesive was cut into 25 mm wide and 100 mm long, and then adhered to an alkali-free plate glass by Corning, Inc. using a laminator. Then, after standing the plate glass in the Temperature and Humidity Room Chamber for 1 hour, its release adhesive strength (dyne/25 mm) was measured at a release angle of 180 and a release speed of 300 mm/minute.

Re-Releasability

The polarizing plate coated with the pressure-sensitive adhesive was cut into 90 mm wide and 170 mm long, and then adhered to an alkali-free plate glass by Corning, Inc. using a laminator. Then, the plate glass was left in the Temperature and Humidity Room Chamber for 1 hour, heated at 50° for 4 hours and left at room temperature for 1 hour, followed by releasing the polarizing plate from the glass. The re-releasability was evaluated as follows:

○: easily released

Δ: released with difficulty

X: released with difficulty as much as the substrate or the glass was broken

Durability

The polarizing plate (90 mm×170 mm) coated with the pressure-sensitive adhesive as prepared in Example 1 was attached to both sides of a glass substrate (110 mm×190 mm×0.7 mm) with each optical absorbing axis crossed. The glass substrate was subjected to a clean room work at the applied pressure of about 5 kg/cm$^2$ so that bubbles or impurities might not be generated. In order to know moisture-heat resistance of the specimens, they were left at a temperature of 60° and a relative humidity of 90% for 1000 hours and then observed about formation of bubbles or releases. Also, in order to evaluate their heat-resistance, they were left at 80° for 1000 hours and then observed about formation of bubbles or releases. The specimens were left at room temperature for 24 hours immediately before evaluating their states. Also, the prepared pressure-sensitive adhesive polarizing plates above were left for 5 or more months and then the durability was evaluated in accordance with the above method. The evaluation standard of durability was as follows:

○: No bubble or release phenomenon was observed.

Δ: a few bubbles or release phenomenon was occurred.

X: large quantity of bubbles or release phenomenon was occurred.

Uniformity of Light Transmission (Light Leakage)

To investigate uniformity of light transmission, the glass substrates were observed about whether light was leaked in a dark room using a backlight. To remove the effect by polarizing devices, the following method was adapted: the pressure-sensitive adhesive layer was coated between two sheets of glass substrates (210 mm×210 mm×0.7 mm), a certain stress ($5 \times 10^{+4}$ Pa) was added thereto, polarizing plates (200 mm×200 mm) were adhered to both sides of the coated glass substrates, with them crossed at 90 degree and then observed. Uniformity of light transmission was evaluated by the following standard:

⊙: Non-uniformity phenomenon of light transmission was difficultly determined by the naked eye.

○: A few non-uniformity phenomenon of light transmission was present.

Δ: Some non-uniformity phenomenon of light transmission was present.

X: A large quantity of non-uniformity phenomenon of light transmission was present.

TABLE 1

| | | Preparation Example | | | | | | |
|---|---|---|---|---|---|---|---|---|
| | | 1 | 2 | 3 | 4 | 5 | 6 | 7 |
| Composition of Copolymers (parts by weight) | n-BA | 98.5 | 98 | 99 | 95 | 99.9 | 99.5 | 99.5 |
| | P-36 | 0.5 | 1 | 2 | 5 | 0.1 | 0 | 0 |
| | AA | | | 0.5 | | | | |
| | 2-HEMA | 1 | 1 | | 1 | 1 | 0.5 | 0.5 |
| | AIBN | 0.03 | 0.03 | 0.03 | 0.03 | 0.03 | 0.03 | 0.1 |
| | EAc | 120 | 120 | 150 | 150 | 120 | 150 | 200 |
| Mw (10,000) | | 150 | 150 | 120 | 130 | 160 | 115 | 70 |
| Molecular Weight Distribution | | 4.9 | 5.5 | 5.4 | 4.8 | 3.8 | 5.1 | 5.3 | n-BA: n-butylacrylate,
P-36: acrylate benzophenone (Trade name: Ebecryl P36, manufacturer: UCB),
2-HEMA: 2-hydroxyethylmethacrylate,
AA: acrylic acid,
AIBN: azobisisobutyronitrile,
EAc: ethylacetate

TABLE 2

|  |  | Example | | | | Comparative Example | | | | | |
|---|---|---|---|---|---|---|---|---|---|---|---|
|  |  | 1 | 2 | 3 | 4 | 1 | 2 | 3 | 4 | 5 | 6 |
| Combination composition (parts by weight) | Preparation Example 1 | 20 | 15 |  |  | 50 | 20 | 100 |  |  |  |
|  | Preparation Example 2 |  |  | 20 |  |  |  |  | 100 |  |  |
|  | Preparation Example 3 |  |  |  | 20 |  |  |  |  |  |  |
|  | Preparation Example 4 |  |  |  |  |  |  |  |  | 100 |  |
|  | Preparation Example 5 |  |  |  |  |  |  |  |  |  | 100 |
|  | Preparation Example 6 | 80 | 85 | 80 | 80 | 50 |  |  |  |  |  |
|  | Preparation Example 7 |  |  |  |  |  | 80 |  |  |  |  |
| Gel content (%) |  | 22 | 17 | 28 | 35 | 80 | 20 | 67 | 70 | 78 | 18 |
| Swelling ratio |  | 85 | 95 | 80 | 65 | 72 | 100 | 35 | 25 | 15 | 150 |
| Molecular weight of Sol (10,000) |  | 75 | 80 | 72 | 70 | 450 | 50 | 81 | 73 | 65 | 82 |
| Adhesion strength |  | 500 | 600 | 450 | 350 | 0 | 900 | 500 | 530 | 200 | 900 |
| Re-releasability |  | ○ | ○ | ○ | ○ | ○ | Δ | ○ | ○ | ○ | X |
| Durability |  | ○ | ○ | ○ | ○ | ⊙ | X | ○ | ○ | X | X |
| Light leakage |  | ⊙ | ⊙ | ⊙ | ○ | Δ | ⊙ | Δ | Δ | X | ⊙ |

As shown in the results of Table 2, Examples 1 to 4 of the present invention have an excellent durability, workability (re-releasability) and low light leakage property. On the other hand, in case of Comparative Example 1, the gel content is departed from the scope of the present invention, so that the stress release property is highly lowered and low light leakage property is disadvantageous. In case of Comparative Example 2, low light leakage property is excellent. However, the molecular weight of Sol is so low that the durability is insufficient. In case of Comparative Examples 3 to 5, they represent the gel content and the swelling ratio departed from the scope of the present invention and thus the cross-linking structure is inappropriate for improving low light leakage. In case of Comparative Example 6, the gel content is in the scope of the present invention, but the swelling ratio is departed from the scope of the present invention, so that the durability is very insufficient.

INDUSTRIAL APPLICABILITY

The pressure-sensitive adhesive composition for a polarizing plate, according to the present invention, has an excellent productivity of polarizing plates through light curing and also an excellent low light leakage property, without changing major properties under a high temperature and a high temperature and humidity such as durability and workability.

The present invention is explained in detail, with reference to the described embodiments above. It is evident to one skilled in the art that various modifications and variations are allowed within the scope and the technical spirit of the present invention. Such modifications and variations should be pertained to the attached claims.

The invention claimed is:

1. An acrylic pressure-sensitive adhesive composition for polarizing plates, comprising a (meth)acrylic copolymer comprising an alkyl(meth)acrylic acid ester monomer, in which alkyl has 2 to 14 carbon atoms, and a copolymerizable monomer containing a photo-initiator group, wherein, the composition forms a crosslinked structure through the reaction of the photo-initiator group, wherein, the composition after forming the crosslinked structure has a gel fraction, represented by Equation 1, of 10 to 55% and a swelling ratio, represented by Equation 2, of 30 to 110, and wherein, the composition after forming the crosslinked structure comprises a sol that is capable of being eluted with ethyl acetate and that has a weight average molecular weight of 600,000 or more:

$$\text{Gel fraction}(\%) = B/A \times 100 \tag{1}$$

$$\text{Swelling ratio} = C/B \tag{2}$$

wherein, A represents weight of the composition after forming the crosslinked structure, B represents dry weight of insoluble content after depositing the composition after forming the crosslinked structure in ethyl acetate at ambient temperature for 48 hours, and C represents weight of insoluble content swollen with ethyl acetate after depositing the composition after forming the crosslinked structure in ethyl acetate at ambient temperature for 48 hours.

2. The acrylic pressure-sensitive adhesive composition for polarizing plates of claim 1, wherein the (meth)acrylic copolymer comprises 50 to 99.8 parts by weight of (meth)acrylic acid ester monomer, in which alkyl has 2 to 14 carbon atoms, and 0.01 to 3 parts by weight of a monomer containing a photo-initiator group.

3. The acrylic pressure-sensitive adhesive composition for polarizing plates of claim 1, wherein the alkyl(meth)acrylic acid ester monomer is one or more selected from the group consisting of ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, n-octyl (meth)acrylate, isooctyl (meth)acrylate, isononyl (meth)acrylate, lauryl (meth)acrylate, and tetradecyl (meth)acrylate.

4. The acrylic pressure-sensitive adhesive composition for polarizing plates of claim 1, wherein the monomer containing a photo-initiator group is a compound of Formula 1:

$$X\text{—}Y \tag{1}$$

wherein,

X represents a hydrocarbon group containing an ethylenic double bond, and

Y represents a hydrocarbon group that may contain a photo-initiating functional group and a heteroatom.

5. The acrylic pressure-sensitive adhesive composition for polarizing plates of claim 4, wherein X represents P-Q-, in which P— represents $CR_1R_2$=CR—CO—, where $R_1$, $R_2$, and R each represents hydrogen or methyl, and Q represents O or a single bond, and Y represents a hydrocarbon group containing a benzoyl group, titanocene, camphorquinone, trichloromethyltriazine or thioxanthene.

6. The acrylic pressure-sensitive adhesive composition for polarizing plates of claim 1, wherein the (meth)acrylic copolymer further comprises 0.01 to 5 parts by weight of a polar monomer.

7. The acrylic pressure-sensitive adhesive composition for polarizing plates of claim 6, wherein the polar monomer is one or more selected from the group consisting of 2-hydroxyethyl (meth)acrylate, 2-hydroxypropyl (meth)acrylate, 4-hydroxybutyl (meth)acrylate, 2-hydroxyethyleneglycol (meth)acrylate, 2-hydroxypropyleneglycol (meth)acrylate, acrylic acid, methacrylic acid, acrylic acid dimer, itaconic acid, maleic acid, and maleic anhydride.

8. The acrylic pressure-sensitive adhesive composition for polarizing plates of claim 1, wherein the (meth)acrylic copolymer further comprises 20 parts by weight or less of a copolymerizable vinyl monomer.

9. The acrylic pressure-sensitive adhesive composition for polarizing plates of claim 8, wherein the vinyl monomer is a compound of Formula 2:

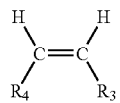

2 wherein, $R_4$ represents hydrogen or alkyl, $R_3$ represents cyano, phenyl unsubstituted or substituted with alkyl, acetyloxy, or $COR_5$, where $R_5$ represents amino or glycidyloxy unsubstituted or substituted with alkyl.

10. The acrylic pressure-sensitive adhesive composition for polarizing plates of claim 1, wherein it further comprises 0.005 to 5 parts by weight of a silane coupling agent or 1 to 100 parts by weight of a tackifier resin based on 100 parts by weight of the (meth)acrylic copolymer.

11. The acrylic pressure-sensitive adhesive composition for polarizing plates of claim 1, wherein the acrylic copolymer is prepared by a polymerization method selected from the group consisting of solution polymerization, photo-polymerization, bulk polymerization, suspension polymerization, and emulsion polymerization.

12. An adhesion polarizing plate comprising a pressure-sensitive adhesive layer containing the acrylic pressure-sensitive adhesive composition according to claim 1 and formed on one side or both sides of a polarizing film.

13. The adhesion polarizing plate of claim 12, further comprising one or more layers selected from the group consisting of a protective layer, a reflective layer, a phase retardation plate, a compensation film for wide view angle and a brightness enhancing film.

14. A liquid crystal display device comprising a liquid crystal cell and the pressure-sensitive adhesive polarizing plate according to claim 12 bound to one side or both sides of the liquid crystal cell.

15. A liquid crystal display device comprising a liquid crystal cell and the pressure-sensitive adhesive polarizing plate according to claim 13 bound to one side or both sides of the liquid crystal cell.

* * * * *